Nov. 28, 1933.   J. M. PORTER   1,937,245
MANUALLY PROPELLED VEHICLE
Filed Nov. 8, 1932   2 Sheets-Sheet 2
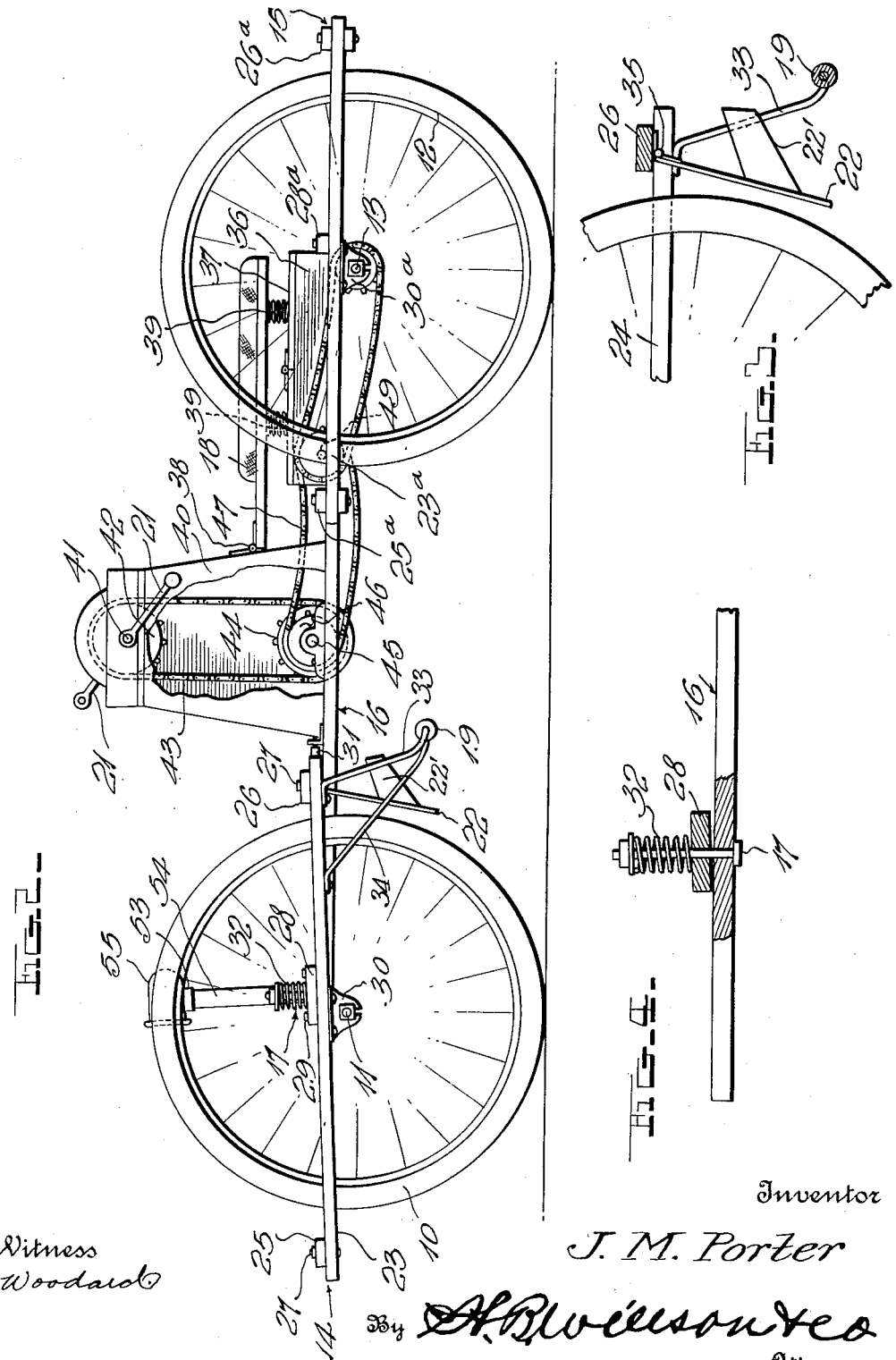
Witness
H. Woodard
Inventor
J. M. Porter
By H. B. Wilson & Co.
Attorneys.

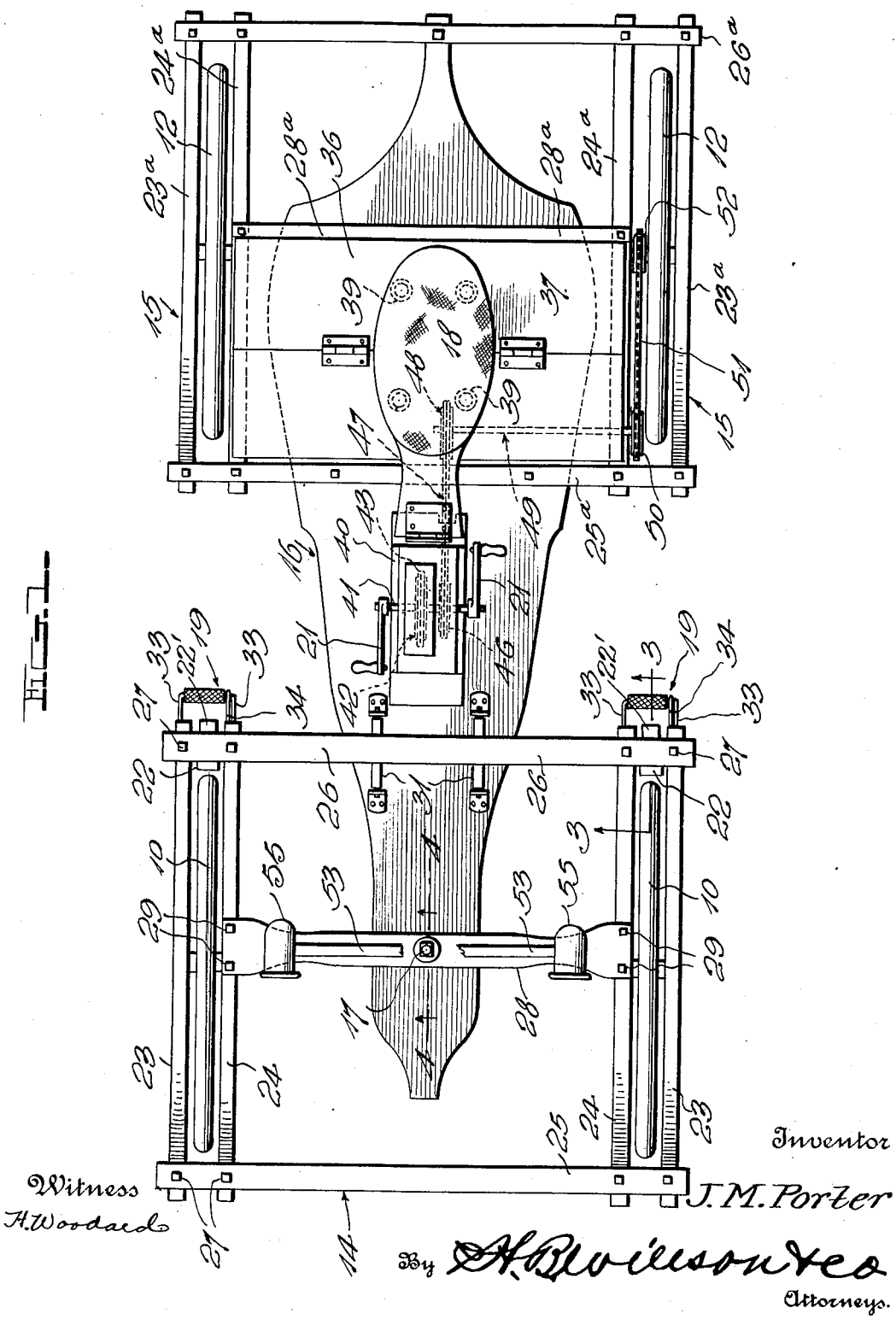

Patented Nov. 28, 1933

1,937,245

UNITED STATES PATENT OFFICE 1,937,245

MANUALLY PROPELLED VEHICLE

John M. Porter, Columbus, Ohio

Application November 8, 1932. Serial No. 641,777

5 Claims. (Cl. 208—32)

The invention aims to provide a simple, inexpensive and light vehicle which may be easily propelled with hand cranks or the like, and steered with the feet, and said vehicle may not only be used for pleasure, but is well adapted for other uses by persons whose legs are abnormal in one way or another.

Fig. 1 is a top plan view.

Fig. 2 is a side elevation partly broken away.

Figs. 3 and 4 are detail sectional views on lines 3—3 and 4—4 of Fig. 1.

The vehicle is provided with two front wheels 10 having short axles 11, and two rear wheels 12 having short axles 13, all of said wheels being preferably conventional bicycle wheels, and said axles being conventional bicycle wheel axles. A front horizontal frame 14 is carried by the front wheels 10 and a similar frame 15 is carried by the rear wheels 12, and a longitudinal body 16 is secured to the rear frame 15 and is pivoted at 17 to the front frame 14. This body is provided with a seat 18 and the frame 14 is equipped with supports 19 for the user's feet, so that steering may be readily effected. Hand cranks 21 are mounted in front of and above the seat 18, and driving connections are provided between these cranks and one of the rear wheels 12. The vehicle may thus be easily propelled by hand and steered by means of the feet, and the feet are also used to apply brakes 22 which hang loosely behind the front wheels 10, slightly in advance of the foot supports 19, it being only necessary to forwardly tilt the feet to apply the brakes. Then too, if desired, a conventional coaster brake hub or the like may be included somewhere in the driving connections between the cranks 21 and the driven wheel 12, for effecting braking power when said cranks are reversely turned.

The front frame 14 includes outer and inner longitudinal bars 23 and 24 located at the outer and inner sides respectively of the wheels 10. Front and rear transverse bars 25 and 26, located in front of and behind the wheels 10 respectively, are secured to the ends of all of the longitudinal bars 23 and 24, by bolts or the like 27. A third and somewhat heavier transverse bar 28 extends between the inner longitudinal bars 24 and is secured to the latter by bolts or the like 29, the longitudinal center of said bar 28 being offset somewhat behind the axes of the wheel axles 11. By means of their conventional nuts, these axles are secured to L-shaped brackets 30 carried by the lower sides of the longitudinal bars 23 and 24.

The front portion of the body 16 extends under the bars 26 and 28, the pivot 17 connects said body with the center of the bar 28, and rollers 31 are mounted upon said body to contact with the lower side of the bar 26. Preferably, a spring 32 is associated with the pivot 17, to assist in absorbing road shocks. This pivot, it will be observed, is somewhat behind the common axis of the axles 11, so that the weights of the body and the user thereon tend somewhat to rearwardly tilt the front frame 14, holding its rear bar 26 upon the rollers 31. The frame 14 is thus prevented from continually oscillating vertically about the axles 11, and the rollers 31 assist in permitting easy steering when the entire frame 14 must be turned about the pivot 17.

The supports 19 for the feet, preferably extend horizontally and transversely behind the wheels 10, and each of these supports is provided with two hangers 33 and a brace 34, said hangers being bolted or otherwise secured to the bar 26 while the braces are secured to the outer longitudinal bars 23. The brakes 22 are hinged at 35 to the bar 26 and are provided with rearwardly projecting foot-engaging actuators 22' located between the hangers 33 and spaced upwardly from the foot supports 19. These actuators are slightly in advance of the normal positions of the anterior portions of the operator's feet and they may therefore be forwardly pushed to apply the brakes, by merely rocking the feet upon the foot rests 19, without the necessity of removing the feet from their steering positions.

The rear frame 16 includes outer and inner longitudinal bars 23$^a$ and 24$^a$ disposed at the outer and inner sides of the wheels 12 and centrally mounted by means of brackets 30$^a$, upon the rear axles 13. Two superposed front bars 25$^a$ and two superposed rear bars 26$^a$ are positioned respectively in front of and behind the rear wheels 12 and are secured to the ends of all of the bars 23$^a$ and 24$^a$. The body 16 is of flat form, extends between the bars 25$^a$ and 26$^a$, and is secured to these bars by bolts or the like 35. An intermediate transverse bar 28$^a$ is secured at its ends to the inner longitudinal bars 24$^a$ and may well constitute the rear wall of a luggage-carrying box 36 which is secured upon the body 16. This box is provided with a hinged cover 37 and the seat 18 which normally overlies said box, is hinged at 38, so that when the cover 37 is to be lifted, the seat may be raised out of the way. This seat is provided with supporting springs 39 which normally rest upon the top of the box, not only yieldably supporting the user's weight, but holding the cover 37 against rattling.

Between the front and rear frames 14 and 15, the body 16 carries an upstanding housing 40. A transverse shaft 41 carrying the cranks 21, extends across the upper portion of this housing and is provided with a sprocket wheel 42 over which a sprocket chain 43 is trained. This sprocket chain is engaged with another sprocket 44 on a short transverse shaft 45 carrying still a third sprocket 46. A longitudinal sprocket chain 47 engages this sprocket 46 and another sprocket 48 on a transverse shaft 49 which extends through the front portion of the box 36. One end of shaft 49 is provided with a sprocket 50 connected by a sprocket chain 51 with a sprocket 52 on one of the rear wheels 12. By only driving one of these rear wheels, the necessary differential movement thereof when rounding curves may take place.

I prefer to dispose a headlight supporting bar 53 above the bar 28 of the front frame 14. Supports for this bar 53 are shown at 54, and the headlights are shown at 55. These headlights may be supplied with current from a battery within a suitable container 56 which may well be mounted on the housing 40.

I claim:

1. In a vehicle, front wheels, a front frame mounted on said wheels and having horizontal portions extending transversely behind said wheels, a body pivoted at its front end to said frame and having a seat, wheeled supporting means for the rear end of said body, supports for the user's feet extending transversely behind said front wheels for steering, and hangers carrying said supports and secured to said frame.

2. In a vehicle, front wheels, a front frame mounted on said wheels and having horizontal transverse frame portions behind said front wheels, a body pivoted at its front end to said frame and having a seat, wheeled supporting means for the rear end of said body, supports for the user's feet extending transversely behind said front wheels for steering, means mounting said supports fixedly on said frame below said horizontal transverse frame portions, and brake members hinged to and depending from said horizontal transverse frame portions in position to be pressed by the feet against the front wheels.

3. In a vehicle, a pair of laterally spaced front wheels having short axles, a front frame comprising longitudinal bars at the outer and inner sides of said wheels and supported between their ends upon said short axles, front and rear bars in front of and behind said wheels respectively and each secured to all of said longitudinal bars, and a third transverse bar between said front and rear transverse bars and secured at its ends to said inner longitudinal bars; a longitudinal body whose front end is pivoted to said third transverse bar, and wheeled supporting means for the rear end of said body.

4. In a vehicle, a pair of laterally spaced front wheels having short axles, a front frame comprising longitudinal bars at the outer and inner sides of said wheels and supported between their ends on the ends of said axles, front and rear transverse bars in front of and behind said wheels respectively and each secured to all of said longitudinal bars, and a third transverse bar between said front and rear transverse bars and secured to the innermost of said longitudinal bars; two laterally spaced rear wheels having short axles, a rear frame comprising longitudinal bars at the inner and outer sides of said rear wheels and supported between their ends on the axles thereof, and front and rear transverse bars in front of and behind said rear wheels respectively and each secured to all of said longitudinal bars of the rear frame; and a longitudinal body secured to said front and rear transverse bars of said rear frame, said third transverse bar of the front frame being pivoted to said body.

5. In a foot-steered vehicle having transverse foot rests upon which the operator constantly holds his feet to direct the course of the vehicle; brake actuators adjacent said foot rests, said brake actuators being slightly in advance of the normal positions of the anterior portions of the operator's feet, whereby said actuators may be forwardly pushed by merely rocking the feet upon said foot rests, without the necessity of removing the feet from said rests.

JOHN M. PORTER.